US012562894B2

(12) United States Patent
Yeomans et al.

(10) Patent No.: US 12,562,894 B2
(45) Date of Patent: Feb. 24, 2026

(54) RANDOM NUMBER GENERATION IN QUANTUM KEY DISTRIBUTION

(71) Applicant: ARQIT LIMITED, London (GB)

(72) Inventors: Andrew Yeomans, Hertfordshire (GB); Omar Iqbal, Hampshire (GB); David Bestwick, Essex (GB)

(73) Assignee: Arqit Limited, London (GB)

( * ) Notice: Subject to any disclaimer, the term of this patent is extended or adjusted under 35 U.S.C. 154(b) by 162 days.

(21) Appl. No.: 18/286,692

(22) PCT Filed: May 11, 2022

(86) PCT No.: PCT/GB2022/051193
§ 371 (c)(1),
(2) Date: Oct. 12, 2023

(87) PCT Pub. No.: WO2022/243657
PCT Pub. Date: Nov. 24, 2022

(65) Prior Publication Data
US 2024/0204998 A1 Jun. 20, 2024

(30) Foreign Application Priority Data

May 18, 2021 (GB) ...................................... 2107113

(51) Int. Cl.
H04L 29/06 (2006.01)
H04L 9/08 (2006.01)
(52) U.S. Cl.
CPC .......... H04L 9/0858 (2013.01); H04L 9/0819 (2013.01); H04L 9/0869 (2013.01)
(58) Field of Classification Search
CPC .... H04L 9/0858; H04L 9/0819; H04L 9/0869
See application file for complete search history.

(56) References Cited

U.S. PATENT DOCUMENTS

| | | | |
|---|---|---|---|
| 7,697,693 B1 * | 4/2010 | Elliott | ................... H04B 10/70 |
| | | | 380/278 |
| 2018/0039485 A1 | 2/2018 | Wilber | |

(Continued)

FOREIGN PATENT DOCUMENTS

| | | |
|---|---|---|
| CN | 112068803 | 12/2020 |
| GB | 2594929 | 11/2021 |

OTHER PUBLICATIONS

Search Report GB Application No. 2107113.9 dated Oct. 21, 2022.

(Continued)

*Primary Examiner* — Evans Desrosiers
(74) *Attorney, Agent, or Firm* — Dentons US LLP

(57) ABSTRACT

A method of operating a quantum key distribution (QKD) system including using a quantum random number generator (QRNG) to generate a random number string (RNS), and storing the RNS; providing the RNS to a first cryptographically secure pseudo-random number generator (CSPRNG) which uses random numbers of the RNS as seeds to generate respective first strings of pseudo-random numbers; using the first strings of pseudo-random numbers to encode photons or pulses transmitted by a transmitter of the QKD system; after a predetermined delay, providing the stored RNS to a second CSPRNG which uses random numbers of the RNS as seeds to generate respective second strings of pseudo-random numbers, the second CSPRNG identically configured to the first CSPRNG; using the second strings of pseudo-random numbers, together with information regarding encoded photons or pulses received by a receiver of the QKD system, to agree secure keys between the transmitter and the receiver.

20 Claims, 4 Drawing Sheets

(56) References Cited

U.S. PATENT DOCUMENTS

2020/0209656 A1 * 7/2020 Young .................. H10H 20/811
2022/0147317 A1 * 5/2022 Hayek ..................... G06F 7/584

OTHER PUBLICATIONS

10th International Symposium on Symbolic and Numeric Algorithms for Scientific Computing (SYNASC), IEEE, 2008, p. 19, "Random Numbers for Quantum Key Distribution," Hugo Zbinden.
Avanesov A. S. et al., "Coherent-state quantum cryptography using pseudorandom number generators," Quantum Electron, Jan. 1, 2019, XP055941774, sections 2, 3.
Avanesov A. S. et al., "On applying pseudorandom number generators in quantum cryptography with coherent states," AIP Conference Proceedings, vol. 2241, Jan. 1, 2020, p. 20026, XP055941786, New York, US.
Herrero-Collantes Miguel et al., "Quantum random number generators," Reviews of Modern Physics, vol. 89, No. 1, Oct. 21, 2016, XP055822716, sections II.A, X, XI.
Nauerth Sebastian, "Air to ground quantum key distribution," Dissertation, Jan. 1, 2013, XP055790645, p. 85.
Bacsardi L, "Resources for Satellite-Based Quantum Communication Networks," 2018 IEEE 22nd International Conference on Intelligent Engineering System (INES), Jun. 21, 2018, pp. 97-102, XP033439571.

* cited by examiner

RANDOM NUMBER GENERATION IN QUANTUM KEY DISTRIBUTION

This application is the National Stage filing under 35 U.S.C. 371 of International Application No. PCT/GB2022/051193, filed May 11, 2022, claims the benefit of GB Application No. 2107113.9, filed May 18, 2021, the contents of which are all hereby incorporated by reference herein in their entirety.

The present application relates to a method, system and software for random number generation in quantum key distribution, and in particular for random number generation in a satellite quantum key distribution system.

BACKGROUND

Cryptography is used to protect billions of transactions every day from, without limitation, for example Transport Layer Security (TLS) security for online shopping and banking to ultra-secure government communications. These transactions rely on reliable and secure means for at least two or more transacting parties to share a secret key, enabling encryption of data by one party and subsequent decryption by other parties.

It is expected that when commercially usable universal quantum computers (QC) become available, a variety of types of transactions, tasks and applications including, without limitation, conventional key distribution processes will be vulnerable. QCs can potentially crack many classical cryptography codes almost effortlessly. The conventional manual key distribution process is not quantum secure by its nature of operation, as it is exposed to both quantum electronic and/or physical compromise at several of the steps involved.

It has been proposed to use quantum key distribution (QKD), such as satellite based quantum key distribution (SQKD), to allow two distant parties to share a key in an information theoretic secure way that is guaranteed by the laws of physics. However, a problem encountered in QKD is that the QKD process requires the generation, storage, and retrieval of random numbers at a very high rate. For example, a QKD system operating at a pulse repetition rate of 2 GHz would require random numbers at a rate several times higher than this at the sending end of the system, and will need to store and retrieve these random numbers for subsequent use in post processing, such as polarisation basis agreement, with the receiving end of the system.

Random number generation rates this high lead to a number of problems, especially onboard satellites of an SQKD system. Ideally, all random choices would originate from a quantum random number generator (QRNG) to provide full compliance with QKD security proofs. However, state-of-the-art QRNGs are at least an order of magnitude too slow to support multi GHz photon generation rates. Although it would be possible to use a large group of QRNGs to collectively generate random numbers at the required rate, this would be complicated and expensive, and such a group would be large, heavy and have a high power consumption, which would be particularly problematic on a satellite. Further, QKD sessions can last several minutes, which places significant demands on the necessary memory/storage within the QKD transmitter and drives a need for real time post processing where these elements are limited. Finally, reading and writing the random number bits to and from memory at such high speeds is difficult with extreme demands placed on processors and/or the need for massively parallel access to memory.

The embodiments described below are not limited to implementations which solve any or all of the problems of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

In a first aspect, the present disclosure provides a method of operating a quantum key distribution (QKD) system, the method comprising: using at least one quantum random number generator (QRNG) to generate a random number string, and storing the random number string; providing the random number string to a first cryptographically secure pseudo-random number generator (CSPRNG) which uses random numbers of the random number string as seeds to generate respective first strings of pseudo-random numbers; using the first strings of pseudo-random numbers to encode photons or pulses transmitted by a transmitter of the QKD system; after a predetermined delay, providing the stored random number string to a second CSPRNG which uses random numbers of the random number string as seeds to generate respective second strings of pseudo-random numbers, the second CSPRNG being identically configured to the first CSPRNG; using the second strings of pseudo-random numbers, together with information regarding encoded photons or pulses received by a receiver of the QKD system, to carry out raw key agreement and post processing to agree secure keys between the transmitter and the receiver.

In a second aspect, the present disclosure provides a method of operating a quantum key distribution (QKD) system, the method comprising: using at least one quantum random number generator (QRNG) to generate a random number string; providing the random number string to a first cryptographically secure pseudo-random number generator (CSPRNG) which uses random numbers of the random number string as seeds to generate respective first strings of pseudo-random numbers; and using the first strings of pseudo-random numbers to encode photons or pulses transmitted by a transmitter of the QKD system.

In a third aspect, the present disclosure provides a method of operating a quantum key distribution (QKD) system, the method comprising: using at least one quantum random number generator (QRNG) to generate a random number string; providing the random number string to a first cryptographically secure pseudo-random number generator (CSPRNG) which uses random numbers of the random number string as seeds to generate respective first strings of pseudo-random numbers; using the first strings of pseudo-random numbers to carry out active base selection by a receiver of the QKD system.

In a fourth aspect, the present disclosure provides a quantum key distribution (QKD) system comprising: at least one quantum random number generator (QRNG) arranged to generate a random number string, and storing the random number string; a first cryptographically secure pseudo-random number generator (CSPRNG) arranged to use random numbers of the random number string as seeds to generate respective first strings of pseudo-random numbers; an encoder arranged to use the first strings of pseudo-random numbers to encode photons or pulses transmitted by a transmitter of the QKD system; and a second CSPRNG arranged to use random numbers of the random number string as seeds to generate respective second strings of pseudo-random numbers, the second CSPRNG being identically configured to the first CSPRNG; wherein the system is arranged to provide the stored random number string to the second CSPRNG after a predetermined delay; and the system is arranged to use the second strings of pseudo-random numbers, together with information regarding encoded photons or pulses received from a receiver of the QKD system, to carry out raw key agreement and post processing to agree secure keys between the transmitter and the receiver.

In a fifth aspect, the present disclosure provides a quantum key distribution (QKD) system comprising: at least one quantum random number generator (QRNG) arranged to generate a random number string; a first cryptographically secure pseudo-random number generator (CSPRNG) arranged to use random numbers of the random number string as seeds to generate respective first strings of pseudo-random numbers; an encoder arranged to use the first strings of pseudo-random numbers to encode photons or pulses transmitted by a transmitter of the QKD system.

In a sixth aspect, the present disclosure provides a quantum key distribution (QKD) system comprising: at least one quantum random number generator (QRNG) arranged to generate a random number string; a first cryptographically secure pseudo-random number generator (CSPRNG) arranged to use random numbers of the random number string as seeds to generate respective first strings of pseudo-random numbers; a base selector arranged to use the first strings of pseudo-random numbers to carry out active base selection by a receiver of the QKD system.

In a seventh aspect, the present disclosure provides a satellite comprising a system according to the fourth or fifth aspects.

In an eighth aspect, the present disclosure provides a ground station comprising a system according to the fourth or fifth aspects.

In a ninth aspect, the present disclosure provides a computer-readable medium comprising code or computer instructions stored thereon, which when executed by a processor, causes the processor to perform the method according to any of the first to third aspects.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
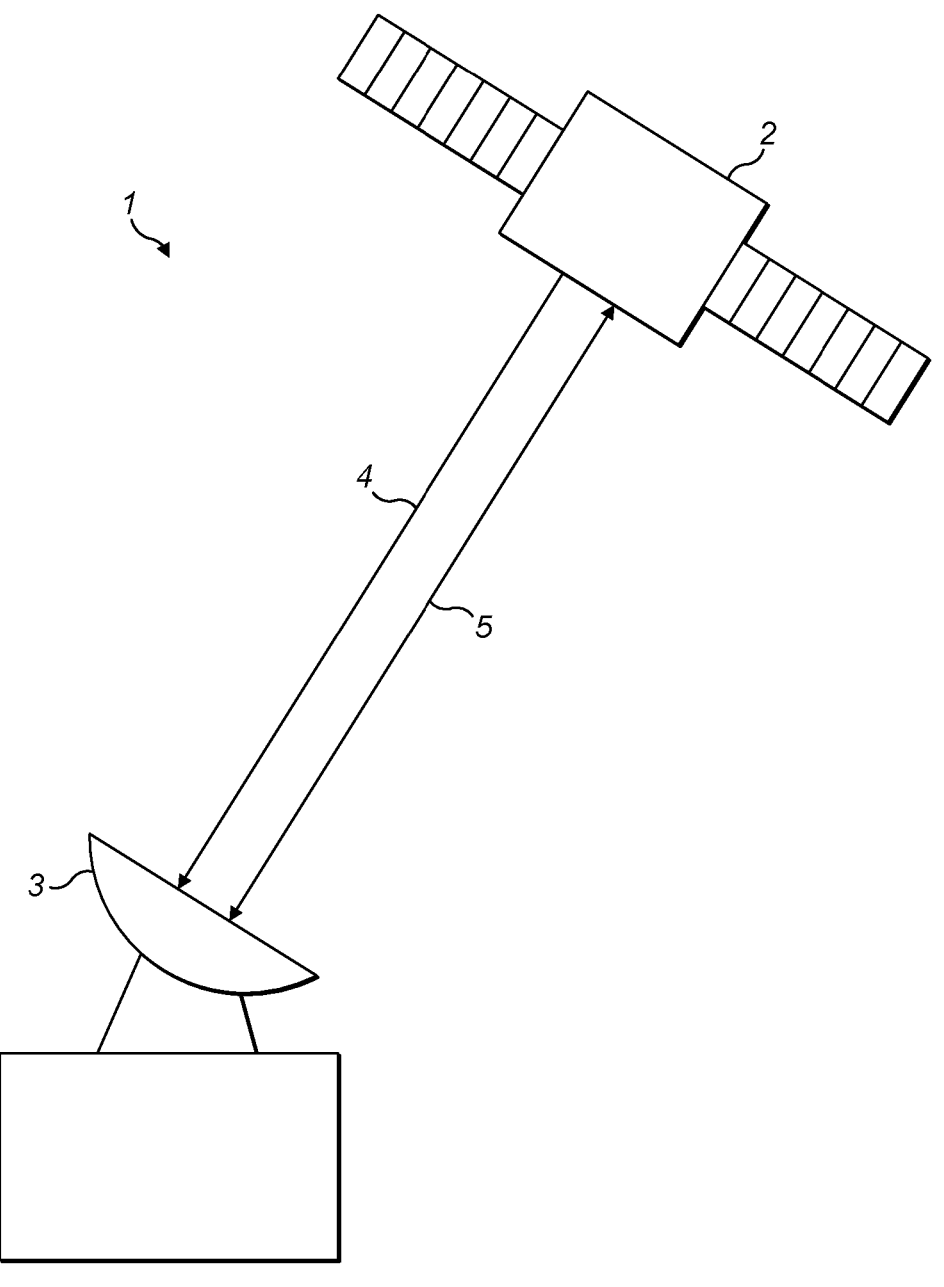
FIG. 1 is a schematic diagram illustrating a satellite quantum key distribution (SQKD) system.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a schematic overview of a part of a satellite based quantum key distribution (SQKD) system. Although the illustrated example of FIG. 1 is an SQKD system, this is not essential, the present disclosure is applicable to any QKD system. As shown in FIG. 1, a satellite based quantum key distribution (SQKD) system 1 comprises a satellite 2 and an optical ground receiver (OGR) 3 at a ground station. During a QKD session, the satellite 2 acts as a transmitter, and sends a quantum laser beam 4 comprising encoded photons and providing a quantum transmission channel down to the OGR 3, which acts as a receiver. The OGR 3 detects the received photons using a photon detection system. The precise nature of the quantum laser beam and the encoding of the encoded photons will depend on the quantum communications protocol being used. The satellite 2 and the OGR 3 also cooperate to provide a bidirectional communication channel 5 between them. Conveniently, this may be a bidirectional laser optical communication channel, but this is not essential, and other types of communication channel may be used.

An overview of the QKD process is that pulses encoded on the basis of random choices are generated at a QKD transmitter located on the satellite 2 and delivered to a QKD receiver at the OGR 3 over a quantum channel formed by the quantum laser beam 4. The pulses may, for example, be generated by a faint pulse source (FPS). The pulses are typically single photons, for example in discrete variable quantum key distribution (DV-QKD) systems, but in some systems quantum information may be encoded across multiple photons, for example in continuously variable quantum key distribution (CV-QKD) systems. The encoded photons received at the OGR 3 are used, together with the corresponding encoded photons transmitted by the satellite 2, to generate secure encryption keys. In operation, because the transmitted encoded photons are faint many of the transmitted encoded photons are lost in transit and are never received at the OGR 3. In practice, it is common for large numbers, such as about 1,000 or 10,000 encoded photons to be transmitted to generate each encoded photon that is received. Accordingly, the rate of delivery of secure encryption keys by the QKD process, and thus the total secure key volume delivered by a QKD session having a specific length, is proportional to the repetition rate of the transmitted pulses, so that it is generally advantageous to provide higher repetition rates to increase the rate of delivery. This is expected to be particularly advantageous in SQKD systems where the length of each QKD session is generally limited by the orbital movement of the satellite.

SQKD generally also requires the exchange of other information between the satellite 2 and the OGR 3, for example, for post processing exchanges to determine which transmitted photons the received photons correspond to and to generate secure keys from the identified corresponding pairs of transmitted and received photons. This information exchange may be carried out using classical lasers also transmitted between the satellite 2 and OGR 3 and forming the bidirectional communication channel 5. The precise information exchanged will depend on the protocol and topology used by the SQKD system 1.

It will be understood that the SQKD system 1 has many additional elements which are not shown in FIG. 1, and will not be described herein. FIG. 1 is merely an explanatory diagram to assist in explaining the requirement for the generation, storage, and playback of random numbers in an SQKD system.

For performing SQKD, or other types of QKD, several steps in the protocol require random choices. As a result, an SQKD a system which might operate at a repetition rate of, say, 2 GHZ, sending a pulse every 500 ps, would need random numbers at a rate several multiples of this, depending on the precise implementation.

For example, in an SQKD system using a balanced 2 decoy state BB84 protocol at a repetition rate of 2 GHz several random choices are needed, namely bit, polarisation basis, intensity and, in some cases, phase randomisation.

In one implementation of a balanced 2 decoy state BB84 protocol, the following random numbers are required at the transmitter for each single photon pulse transmitted:

1 random bit to choose the basis value to be encoded, i.e. '1' or '0', with equal probability.

1 random bit to choose the polarisation, i.e. horizontal/vertical (H/V) or diagonal/antidiagonal (D/A), with equal probability.

3 random bits to choose the intensity, i.e. signal, decoy or 2nd decoy, with probabilities of 75%, 12.5% and 12.5% respectively.

4 random bits to randomly modulate the phase, i.e. consisting of 16 discrete values chosen with equal probability.

Thus, for each transmitted pulse, 9 random bits are required, resulting in the following requirement on random number generation rate for a 2 GHz pulse repetition rate:

$$RNG \text{ } Rate = (1 + 1 + 3 + 4) \times 2 \text{ } GHz = 18 \text{ } Gbps$$

Accordingly, for a pulse repetition rate of 2 GHZ, a random number generation rate of 18 Gbps would be required.

It will be understood that this value is only an example, and is specific to a particular protocol and implementation. For example, for this protocol, an adjustment in the basis bias would require more random numbers, likewise with decoy states, but using an inherently phase-randomised source would remove the need for 4 random bits for phase randomisation. The use of alternative protocols would make more radical changes to the calculation. However, this example illustrates the general point that QKD and SQKD transmitters generally require random numbers at multiple times their pulse repetition rate.

In practice, supporting random number generation rates this high are challenging for several reasons, particularly for an SQKD transmitter on board a satellite. Ideally, all random choices would originate from a quantum random number generator (QRNG) to provide full compliance with QKD security proofs. However, state-of-the-art QRNGs limit achievable photon generation rates, with output rates of random numbers, after randomness extraction and entropy conditioning, well below 1 GHZ. In principle, it would be possible to use a group or bank comprising multiple QRNGs to provide random numbers at any desired rate, but the cost and complexity is a problem. Further, such a bank of multiple QRNGS may be relatively large and heavy, and consume a lot of power, so that the payload size, weight, and power (SWaP) demands of multiple QRNGs are a particular problem for satellite systems.

Further, the random numbers used to generate the pulses must be retained at the transmitter and used in the post processing exchanges to generate secure keys from the corresponding transmitted and received encoded photons. In general, during these post processing exchanges, the post processing on the satellite 2 looks up the basis, polarization and intensity bits that correspond to each received photon. This post processing may be based on photon identifiers, such as timestamps, of photons received at the OGR 3. These timestamps may be sent from the OGR 3 to the satellite 2 using the bidirectional communication channel 5.

This demands a large amount of memory or data storage within the QKD/SQKD transmitter. Further, reading and writing the random number bits to and from memory at such a high rate is difficult, and places extreme demands on processors and/or requires massively parallel access to memory, needing a wide data bus and high speed parallel access to a large amount of volatile memory. QKD/SQKD communication sessions can last several minutes, so that the very large volume of random numbers which would require storage over a complete session drives a preference for real time post processing during the QKD/SQKD session to limit memory/data storage requirements. Further, this requirement to store a very large volume of random numbers limits the feasibility of storage of data for offline post processing after the quantum communication session completes, and so limits the possible QKD system architectures and procedures which can be used.

Figure 2:
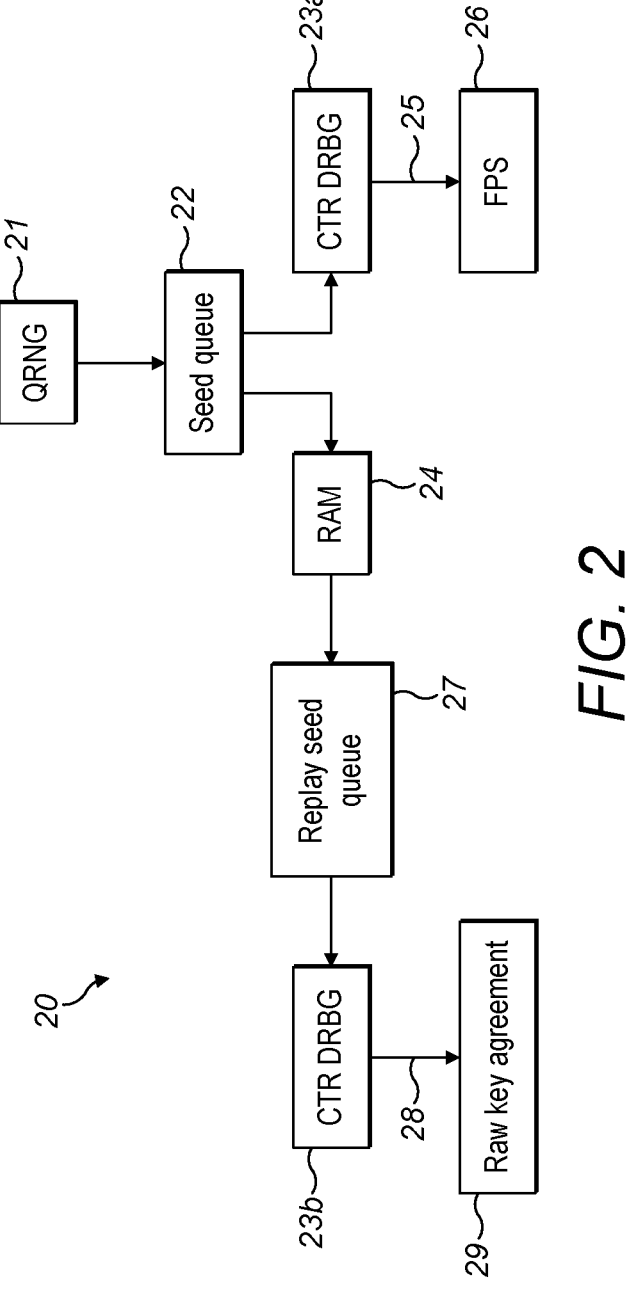
FIG. 2 is a schematic diagram illustrating a part of a random number generation system according to a first embodiment.

FIG. 2 shows a schematic diagram illustrating a part of a random number generation system 20 according to a first embodiment. The random number generation system 20 of FIG. 2 is a part of, or is associated with, an SQKD transmitter of the satellite 2 of the SQKD system 1.

As shown in FIG. 2, the random number generation system 20 comprises a QRNG 21. The QRNG 21 is a random number generator that operates based on physical principles, such as quantum mechanical phenomena, to provide random numbers. For example, the QRNG 21 may comprise a single-photon source, a balanced beamsplitter and a single-photon detector at each output to generate random numbers based on the detection of photons by the different single photon detectors. The skilled person will be aware of a number of different types of QRNGs. Any of these may be used, the precise construction of the QRNG 21 is not important to the present disclosure.

In operation of the SQKD system, the QRNG 21 generates a seed queue 22 comprising a series of random numbers. This seed queue 22 is provided to a first cryptographically secure pseudo-random number generator (CSPRNG) 23a, and the first CSPRNG 23a uses each random number of the seed queue 22 as a seed to generate a series, or string, of pseudo-random numbers 25. The first CSPRNG 23a is a deterministic random bit generator (DRBG). The first CSPRNG 23a is referred to as pseudo-random because a CSPRNG is deterministic, and generates a predictable and repeatable string of predetermined length of pseudo-random numbers with values which depend upon the value of the initial number used as a seed. In some examples the predetermined length of the string of pseudo-random numbers may be 250, or 2500, or any other desired number. The first CSPRNG 23a may operate in a National Institute of Standards and Technology (NIST) compliant manner according to the NIST Special Publications specifying the design and implementation of random bit generators, such as SP 800-90A, Recommendation for Random Number Generation Using Deterministic Random Bit Generators; SP 800-90B, Recommendation for the Entropy Sources Used for Random Bit Generation; and/or SP 800-90C, Recommendation for Random Bit Generator (RBG) Constructions. However, the first CSPRNG 23a may alternatively, or additionally, comply with other standards, as appropriate.

The seed queue 22 is also provided to a memory or data store 24, where the series of random numbers making up the seed queue 22 are stored temporarily.

The strings of pseudo-random numbers 25 generated by the first CSPRNG 23a are provided to a transmitter 26 of the SQKD system 1, and are used by the transmitter 26 to make the various random choices used to encode the photons or pulses forming the transmitted quantum laser beam 4.

Accordingly, each bit of QRNG source entropy in the seed queue 22 produced by the QRNG 21 is used by the first CSPRNG 23a to seed and generate multiple bits of output entropy in the strings of pseudo-random numbers 25 generated by the first CSPRNG 23a. The increase in the bit rate, or the rate of generation of random numbers, of the QRNG 21 relative to the bit rate, or the rate of generation of pseudo-random numbers, of the first CSPRNG 23a, corresponds to the length of each string of pseudo-random numbers 25 produced by the CSPRNG 23a from a single seed random number. The ratio between the bit rate of the QRNG and the bit rate of the CSPRNG 23a may be referred to as the rate amplification provided by the first CSPRNG 23a. The level of this rate amplification is configurable based on the requirements of the user in any specific implementation. In some examples, the level of rate amplification may be configured so that the encoding of the secure keys produced by the QKD/SQKD system is purely based on entropy from the QRNG such that full compliance with QKD security proofs is maintained, The rate amplification by the first CSPRNG 23a enables pseudo-random numbers derived from the random number output of a single QRNG 21 to be provided to the SQKD transmitter at any desired rate regardless of the actual random number output rate of the QRNG 21, while maintaining compliance with relevant security standards. For example, by utilising a DRBG compliant with relevant NIST standards, currently NIST SP-800-90-A,B,C, as the first CSPRNG 23a combined with a QRNG 21 also in a NIST compliant way, the NIST standards on random number generation can be satisfied by the output strings of pseudo-random numbers 25. It may be desirable for the QRNG 21 to comply with standards for random number generation, there are currently no specific NIST standards for QRNGs.

In practice, for any specific rate of number output, a DRBG, such as the first CSPRNG 23a, can be made much smaller and lighter, with a smaller power consumption, and more simply and cheaply, than a QRNG. Accordingly, use of this rate amplification approach according to the embodiment may allow random numbers to be provided at a rate required by a transmitter of a QKD or SQKD system in a cheaper and simpler manner with reduced size, weight, and power requirements, which may provide a solution to the problems identified above.

As mentioned above, in addition to being supplied to the first CSPRNG 23a, the seed queue 22 is also provided to a memory or data store 24, for storage of the series of random numbers making up the seed queue 22. Following a predetermined delay period, these stored numbers are read back out of the data store 24 as a replay seed queue 27, which replicates the sequence of number values of the seed queue 22, but at a later time separated by the predetermined delay period. In some examples the predetermined delay period may be a fixed delay period.

The replay seed queue 27 is provided to a second CSPRNG 23b, which is identically configured to the first CSPRNG 23a, and the second CSPRNG 23a uses each random number of the replay seed queue 27 as a seed to generate a series, or string, of pseudo-random numbers 28. As is discussed above, the first CSPRNG 23a, and thus the identically configured second CSPRNG 23b, are deterministic, and each generates the same predictable and repeatable string of predetermined length of pseudo-random numbers with values which depend upon the value of the initial number used as a seed. Accordingly, since the replay seed queue 27 is identical to the seed queue 22 and delayed relative to the seed queue 22 by the delay period, and the first and second CSPRNGs 23a and 23b are identically configured, the strings of pseudo-random numbers generated by the second CSPRNG 23b are identical to the strings of pseudo-random numbers generated by the first CSPRNG 23b, but delayed by the predetermined delay period.

The first CSPRNG 23a and the second CSPRNG 23b are described as identically configured. This means that the first and second CSPRNGs 23a and 23b will generate the same string of predetermined length of pseudo-random numbers in response to the input same seed. In practice, it is expected that it will be convenient for the first and second CSPRNGs 23a and 23b to be identical, in addition to being identically configured, but this is not essential.

The strings of pseudo-random numbers 28 generated by the second CSPRNG 23b are provided to a raw key agreement system 29 of the SQKD system 1, and are used to carry out post processing exchanges to generate secure keys from the corresponding transmitted and received encoded photons in a conventional manner. The predetermined delay period is selected to correspond to the time taken between the generation of pseudo-random numbers by the first CSPRNG 23a and the reception at the raw key agreement system 29 of information regarding the encoded photons or pulses which were encoded using those pseudo-random numbers and received at the SQKD receiver of the SQKD system 1. Accordingly, this delay period may be regarded as the round trip time of the SQKD system 1. The raw key agreement system 29 identifies which of the transmitted encoded photons or pulses correspond to the received encoded photons or pulses received at the SQKD receiver, based on their timings. The pseudo-random numbers corresponding to these received encoded photons or pulses, that is, the pseudo-random numbers used to encode them for transmission, are retained for use in further stages of key agreement between the SQKD transmitter and the SQKD receiver, while the other pseudo-random numbers corresponding to encoded photons or pulses which were not received at the SQKD receiver can be discarded. This may reduce the data storage requirements of the SQKD transmitter.

By using the second CSPRNG 23*b* to generate the strings of pseudo-random numbers 28 from the replay seed queue 27, only the seed queue 27 needs to be stored into, and subsequently read out of, the data store 24, and not the much larger strings of pseudo-random numbers 25 and 28. In other words, instead of the entire random number string used by the QKD or SQKD transmitter 26 needing to be stored, only the QRNG 21 string which is used as the seed queue 27 to the CSPRNGs 23*a* and 23*b* needs to be stored. Therefore, far fewer random numbers need to be stored, the factor by which the quantity of random numbers requiring storage being reduced corresponding to the level of rate amplification provided by the CSPRNGs 23*a* and 23*b*, and the random numbers can be read and written correspondingly more slowly.

The replaying of the replay seed queue 27 to the second CSPRNG 23*b* takes advantage of the fact that two identically configured DRBGs, such as CSPRNGs, fed with two identical seeds will output two identical pseudo-random number strings. The storage and later replaying of the seed queue used to provide the CSPRNG seeds may overcome the difficulties associated with storing large volumes of random bits and reading/writing them at high speeds by greatly reducing the volume of random bits which must be stored, and greatly reducing the rate at which they must be read into and out of storage. Accordingly, use of the replay approach according to the embodiment together with the rate amplification discussed above may allow the problems of required storage amount and read and wrote speeds to be overcome.

In the first embodiment of FIG. 2, the first CSPRNG 23*a* and the second CSPRNG 23*b* are a single CSPRNG. This is for clarity and simplicity of understanding, and it will be understood that each of the first and second CSPRNGS 23*a* and 23*b* could instead be multiple CSPRNGs arranged in a suitable manner, such as in parallel. The use of multiple CSPRNGs may be preferred in order to provide a higher level of rate amplification and/or to provide a higher pseudo-random number output rate.

Figure 3:
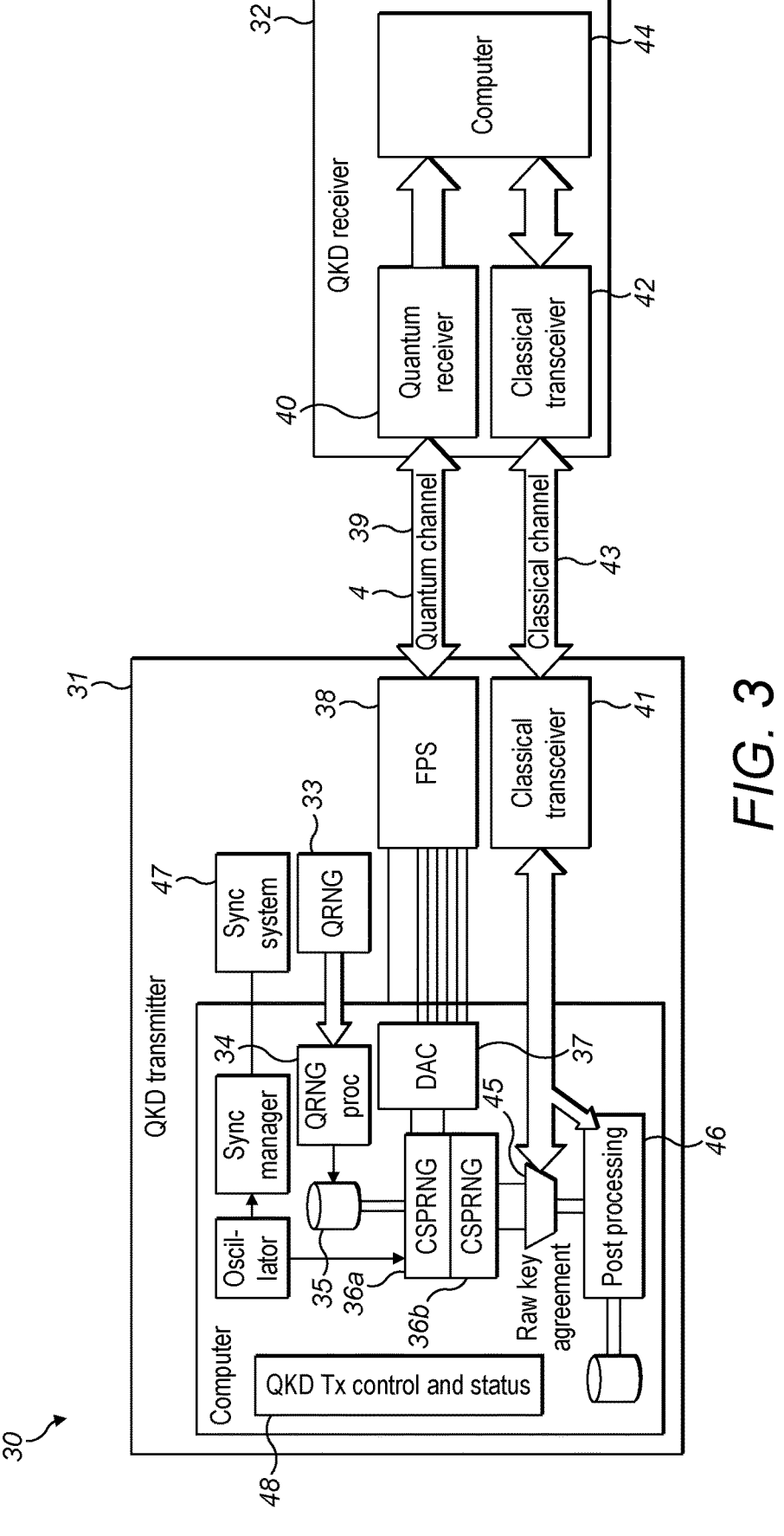
FIG. 3 is a schematic diagram illustrating an SQKD system comprising a random number generator according to a second embodiment.

FIG. 3 shows a more detailed schematic diagram of an SQKD system 30 according to a second embodiment and comprising a random number generation system using the rate amplification and replay approaches of the first embodiment.

As shown in FIG. 3, the SQKD system 30 comprises a QKD transmitter 31 located on a satellite, and a QKD receiver 32 located at an OGR.

The QKD transmitter 31 located on the satellite comprises a QRNG 33. The QRNG 33 generates a raw random number string as an output, and this is provided to a QRNG processor 34. The QRNG processor 34 carries out post-processing on the raw random number string output by the QRNG 33 to provide as an output a higher quality string of random numbers which satisfy the NIST requirement of full entropy. The string of random numbers output from the QRNG processor 34 is then stored in a QRNG store 35. The QRNG 33 and the QRNG processor 34 collectively correspond to the QRNG 21 of the first embodiment, and the output of the QRNG processor 34 corresponds to the seed queue 22 of the first embodiment.

The QKD transmitter 31 further comprises first and second CSPRNG modules 36*a* and 36*b*, which are identically configured. The first and second CSPRNG modules 36*a* and 36*b* correspond to the first and second CSPRNGs 23*a* and 23*b* of the first embodiment. In operation of the QKD transmitter 31 each of the first and second CSPRNG modules 36*a* and 36*b* is seeded by the string of random numbers stored in the QRNG store 35 to provide rate amplification and generate pseudo-random numbers at a higher rate than the random number output from the QRNG processor 34 in a NIST certified manner. It should be understood that each of the first and second CSPRNG modules 36*a* and 36*b* may comprise a single CSPRNG, or may comprise multiple CSPRNGs arranged in parallel, or in some other manner, to provide a desired degree of rate amplification. The first and second CSPRNG modules 36*a* and 36*b* are provided with the same string of random numbers stored in the QRNG store 35 separated by a predetermined delay period, so that they generate identical strings of pseudo-random numbers separated by the predetermined delay period, as discussed above with reference to the first embodiment. The QRNG store 35 operates as a buffer for the supply of the string of random numbers from the QRNG processor 34 to the first CSPRNG module 36*a*, usually substantially immediately, which random number string corresponds to the seed queue 22, and the delay period between the strings of random numbers provided to the first and second CSPRNG modules 36*a* and 36*b* from the QRNG store 35 allows the QRNG store 35 to provide a corresponding function to the data store 24, and allows the string of random numbers provided to the second CSPRNG module 36*b* to correspond to the replay seed queue 27.

The string of pseudo-random numbers generated by the first CSPRNG module 36*a* is provided to a digital-to-analog converter (DAC) 37, which converts the pseudo-random numbers to analog random number signals and provides the analog random number signals to a faint pulse source (FPS) system 38. The FPS system 38 uses the analog random number signals to encode photons or pulses for transmission in a quantum channel 39 carried by a quantum laser beam 4 to a quantum receiver 40 of the QKD receiver 32. The FPS system 38 typically includes a laser source and a photon encoding system. The use of an FPS system is not essential, and another type of quantum beam generator may be used, for example a true single photon source in prepare and measure DVQKD implementations, or a CVQKD source comprising a continuous laser. The skilled person will understand how to provide a quantum beam generator, such as an FPS system, so that it is not necessary to describe this in detail herein.

The QKD transmitter 31 further comprises a classical transceiver 41, while the QKD receiver 32 further comprises a classical transceiver 42. The QKD transmitter 31 and the QKD receiver 32 use the classical transceivers 41 and 42 to provide a classical (non-quantum) bidirectional communications channel 5 between them. In the illustrated example the classical transceivers 41 and 42 each comprise laser transmitters and optical receivers to provide a bidirectional optical communications channel between them.

The QKD receiver 32 further comprises a computer 44 arranged to record and time tag encoded photons or pulses received through the quantum beam 39 by the quantum receiver 40, and to provide information regarding the timings of the received encoded photons or pulses to the QKD transmitter using the bidirectional communications channel 43.

As is discussed above, the QRNG store 35 provides the same string of random numbers to the identically configured first and second CSPRNG modules 36a and 36b at times separated by the delay period, so that first and second CSPRNG modules 36a and 36b generate identical strings of pseudo-random numbers separated by the delay period. The delay between the QRNG store 35 providing the string of random numbers to the first CSPRNG module 36a and providing the string of random numbers to the second CSPRNG module 36b is predetermined, and has a value which substantially corresponds to the time taken for the encoded photons or pulses based on the pseudo-random numbers to be generated at the QKD transmitter 21 and sent to the QKG receiver 32, processed, and the information regarding the timings of the received encoded photons or pulses from the QKD receiver 32 to be received back at the QKD transmitter 31 through the classical bidirectional communications channel 43. Similarly to the first embodiment, this predetermined delay may be regarded as corresponding to a round trip time of the SQKD system 30. In some examples, this may be around 3 seconds. In some examples the predetermined delay may be a fixed delay.

The string of pseudo-random numbers generated by the second CSPRNG module 36b is provided to a raw key agreement module 45. As is explained above, the string of pseudo-random numbers generated by the first CSPRNG module 36a and the string of pseudo-random numbers generated by the second CSPRNG module 36b are identical, but separated in time by the predetermined fixed delay, so that at any given time, the string of pseudo-random numbers provided by the second CSPRNG module 36b to the raw key agreement module 45 is at a point in the string of pseudo-random numbers substantially corresponding to the point in the string of pseudo-random numbers used to generate the encoded photons or pulses which are the subject of the information regarding the timings of the received encoded photons or pulses being provided to the raw key agreement module 45 from the QKD receiver 32. The QKD transmitter 31 and the QKD receiver 32 are then able to perform raw key agreement. That is, they are able to determine which encoded photons or pulses sent by the QKD transmitter 31 were registered as pulse detection events by the QKD receiver 32. The QKD transmitter then retains the pseudo-random numbers associated with these sent encoded pulses, or in other words, the pseudo-random numbers which were used to determine the encoding applied to these sent encoded photons or pulses, and discards the remaining pseudo-random numbers. As is explained above, the proportion of the sent encoded photons or pulses which are received and registered as pulse detection events by the QKD receiver 32 may be very low, such as about 1 in 1,000 or 1 in 10,000, so that this allows the amount of pseudo-random numbers which must be stored to be greatly reduced.

The retained pseudo-random numbers generated by the second CSPRNG module 36b associated with the sent encoded photons or pulses which were registered as pulse detection events by the QKD receiver 32 are provided to a post-processing module 46, which use the retained pseudo-random numbers and the information regarding the encoded photons or pulses from the QKD receiver 32 to carry out post processing exchanges to generate secure keys from the corresponding transmitted and received encoded photons in a conventional manner. The post-processing module 46 provides the generated secure keys or secure key material to a key store 47 of the QKD transmitter 31 for storage and subsequent use.

As is discussed above, the predetermined fixed delay substantially corresponds to the round trip time of the SQKD system 30. Conveniently, the SQKD system 30 may be arranged so that the information regarding the encoded photons or pulses from the QKD receiver 32 is received and buffered slightly before the corresponding pseudo-random numbers from the second CSPRNG module 36b. Then, when the raw key agreement module 45 processes the information regarding the encoded photons or pulses and the corresponding pseudo-random numbers, the pseudo-random numbers associated with the encoded photons or pulses, for example, the pseudo-random bits used to determine the basis, intensity and polarisation related to the encoded photons or pulses, are written into memory to form a raw key block, and this is repeated for each encoded photon or pulse identified as being received. The rest of the pseudo-random numbers are discarded as they are no longer required. The raw key blocks that are stored are then used as the basis for subsequent QKD post processing steps by the post-processing module 46. This may include basis/intensity sifting, error correction and privacy amplification. It will be understood that since the proportion of the sent encoded photons or pulses which are received and registered as pulse detection events by the QKD receiver 32 may be very low, buffering the information regarding the encoded photons or pulses will be less demanding than buffering the pseudo-random number string.

Similarly to the first embodiment, the first and second CSPRNG modules 36a and 36b may each comprise any required number of DRBGs to provide a desired level of rate amplification.

The QKD transmitter 31 further comprises a synchronisation system 47 to maintain time synchronisation between the QKD transmitter 31 and the QKD receiver 32 so that the identities of transmitted and received encoded photons can be reconciled. The QKD transmitter 31 further comprises a control system 48.

It will be understood that FIG. 3 shows only parts of the QKD system 30 required to explain the random number generation and replay concept. In practice there will be many other components in the QKD system 30.

The processing and computer elements of the QKD system 30 may comprise a mix of software and firmware functions which could be implemented on GPUs and FPGAs. Functions may be partitioned on discrete devices.

In the second embodiment, similarly to the first embodiment, by using the second CSPRNG module 36b to generate the strings of pseudo-random numbers after a delay, only the random numbers from the QRNG 33 need to be stored into, and subsequently read out of, the QRNG store 34, and not the much larger strings of pseudo-random numbers generated by the first and second CSPRNG modules 36a and 36b. In other words, instead of the entire random number string used by the QKD transmitter 26 needing to be stored, only the random number string from the QRNG 33 which is used to seed the first and second CSPRNG modules 36a and 36b needs to be stored. Therefore, far fewer random numbers need to be stored, the factor by which the quantity of random numbers requiring storage being reduced corresponding to the level of rate amplification provided by the CSPRNG modules 36a and 36b, and the random numbers can be read and written correspondingly more slowly.

As discussed above regarding the first embodiment, for any specific rate of number output, DRBGs, such as the CSPRNG modules 36a and 36b, can be made much smaller and lighter, with a smaller power consumption, and more simply and cheaply, than QRNGs. Accordingly, use of this rate amplification approach according to the embodiment may allow random numbers to be provided at a rate required by a transmitter of a QKD or SQKD system in a cheaper and simpler manner with reduced size, weight, and power requirements, which may provide a solution to the problems identified above.

Figure 4:
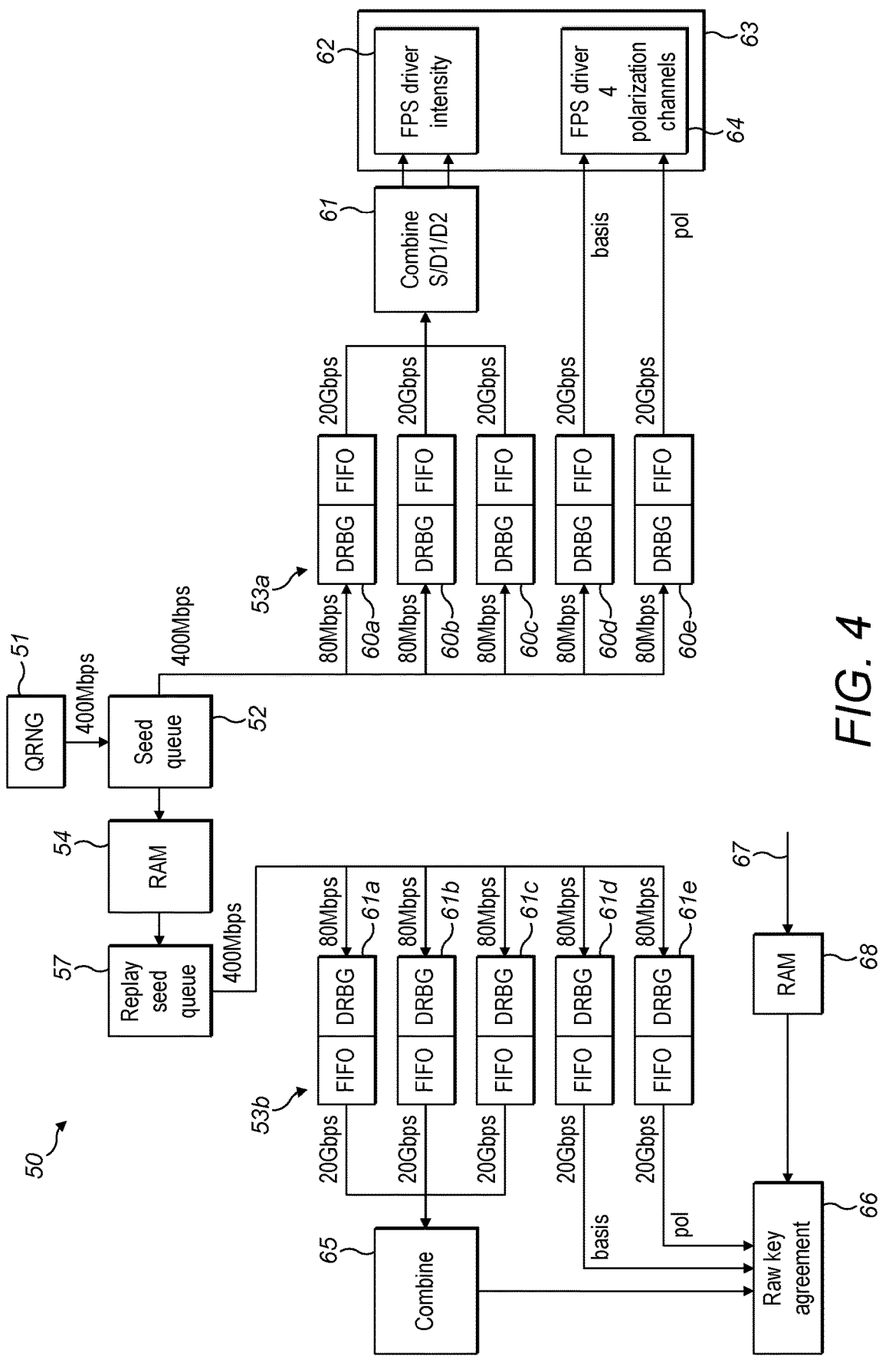
FIG. 4 is a schematic diagram illustrating a part of a random number generation system in more detail.

FIG. 4 shows a more detailed schematic diagram of a part of a random number generation system 50 according to a third embodiment. Similarly to the first embodiment, the random number generation system 50 of FIG. 4 is a part of, or is associated with, an SQKD transmitter of the satellite 2 of the SQKD system 1.

In the embodiment of FIG. 4, the random number generation system 50 has an initial random number generation rate of 400 Mbps, which would only support a QKD repetition rate of about 80 MHZ, and uses the rate amplification and replay approaches of the first and second embodiments to enable a QKD repetition rate of up to 20 GHz. In some examples the random number generation system 50 could support a QKD transmitter 31 and QKD receiver 32 having a QKD repetition rate below 20 GHz, with the 'excess' random number generation capacity being available to enable significant biasing in polarisation basis and signal/decoy ratio without reducing the QKD repetition rate. The up to 20 GHz QKD repetition rate could be for a single QKD transmitter 31 and QKD receiver 32, as shown in FIG. 3. In alternative examples, the random number generation system 50 could be used to support multiple QKD transmitters and multiple QKD receivers having a total QKD repetition rate of up to 20 GHZ, for example two QKD transmitters and two QKD receivers each having a QKD repetition rate of up to 10 GHz.

As shown in FIG. 4, the SQKD system 50 comprises a QRNG 51 that generates a seed queue 52 of random numbers at a rate of 400 Mbps. This seed queue 52 is provided to a first CSPRNG 53a comprising an array of five DRBGs 60a to 60e arranged in parallel. The seed queue 52 is divided between the five DRBGs 60a to 60e arranged in parallel, so that each of the five DRBGs 60a to 60e is provided with random numbers from the QRNG 51 at a rate of 80 Mbps. Each of the of the DRBGs 60a-e generates a string of 250 pseudo-random numbers from each seed random number, generating pseudo-random numbers at a rate of 20 Gbps, and so applying a rate amplification factor of 250. Accordingly, the five DRBGs 60a to 60e collectively provide pseudo-random numbers at a rate of 100 Gbps.

In the illustrated embodiment of FIG. 4, the SQKD system 50 uses a balanced 2 decoy state BB84 protocol without phase randomisation, so that each single photon pulse emitted requires five basis bits, which are respectively provided by the five DRBGs 60a to 60e. The DRBGs 60a to 60c each provide a bit which are combined in a combiner/selector 61 to choose a signal intensity for the single photon pulse as signal, decoy or 2nd decoy, with probabilities of 75%, 12.5% and 12.5% respectively, and the combiner/selector 61 provides this decision to an FPS driver assembly 62 of a FPS transmitter 63 of the SQKD system 50. The DRBG 60d provides a bit to choose the basis value to be encoded, i.e. horizontal/vertical (H/V) or diagonal/antidiagonal (D/A), with equal probability. The DRBG 60e provides a bit to choose the polarization state of the selected basis, i.e. either horizontal or vertical when H/V was selected, or either diagonal or antidiagonal when D/A was selected, with equal probability. The bits from the DRBGs 60d and 60e are provided to an FPS driver polarisation channels assembly 64 of the FPS transmitter 63 of the SQKD system 50. Accordingly, the five DRBGs 60a to 60e providing each of these pseudo-random bits at a rate of 20 Gbps can support a QKD pulse repetition rate from the FPS transmitter 63 of the SQKD system of 20 GHZ.

The seed queue 52 is also provided to a memory 54, where the series of random numbers making up the seed queue 52 are stored temporarily. Following a predetermined fixed delay period, these stored random numbers are read back out of the memory 54 as a replay seed queue 57, which replicates the sequence of number values of the seed queue 52, but at a later time separated by the predetermined fixed delay period.

The replay seed queue 57 is provided to a second CSPRNG 53b, which is identically configured to the first CSPRNG 53a, and comprises an array of five DRBGs 61a to 61e arranged in parallel. Each of the five DRBGs 61a to 61e are identically configured to a corresponding one of the five DRBGs 60a to 60e respectively, and the replay seed queue 57 is divided between the five DRBGs 61a to 61e in an identical manner to the division of the seed queue 52 between the five DRBGs 60a to 60e. Accordingly, each of the five DRBGs 61a to 61e is provided with random numbers from the QRNG 51 at a rate of 80 Mbps. Each of the of the DRBGs 61a-e generates a string of 250 pseudo-random numbers from each seed random number, generating pseudo-random numbers at a rate of 20 Gbps, and so applying a rate amplification factor of 250.

The DRBGs 61a to 61c each provide a bit which are combined in a combiner 65 to duplicate the choice of signal intensity for the single photon pulse as signal, decoy or 2nd decoy, provided by the combiner/selector 61 based on the output of the DRBGs 60a to 60c, and the combiner 65 provides this decision to raw key agreement system 59 of the SQKD system 50. The DRBG 61d provides a bit duplicating the bit used to choose the basis value to be encoded provided by the DRBG 60d. The DRBG 61e provides a bit to duplicating the bit used to choose the polarization provided by the DRBG 60e. The bits from the DRBGs 61d and 60e are also provided to the raw key agreement system 59 of the SQKD system 50.

Information 67 regarding the encoded photons or pulses which were encoded, transmitted, and subsequently received at the SQKD receiver of the SQKD system 50 are buffered in a memory 68, and then provided to the raw key agreement system 66 for comparison with the pseudo-random bits from the DRBGs 61a to 61e in a corresponding manner to that used in the first and second embodiments.

The embodiments described above have a fixed rate amplification factor, where the, or each, CSPRNG produces a fixed amount of pseudo-random numbers from each random number seed. In alternative examples, the system may be arranged to have an alternative mode in which the CSPRNGs are bypassed, and the random number output from the QRNG is used directly to encode the photons or pulses forming the transmitted quantum laser beam without any rate amplification or replay using the CSPRNGs, or in which the CSPRNGS operate with an amplification factor of one. This alternative mode can be thought of as a 'full quantum entropy mode' as opposed to a 'partial quantum entropy mode' with rate amplification and replay using the CSPRNGs, and this full quantum entropy mode will fully satisfy the requirements of QKD security proofs, although at a lower pulse repetition rate than the partial quantum entropy mode. In such examples, the system may switch between the different modes based on user requirements.

Different users of the system and the generated encryption keys may have different requirements for the degree of quantum sourced entropy used to encode photons.

In alternative examples, the system may be configured to have a variable rate amplification factor in the partial quantum entropy mode with rate amplification and replay using the CSPRNGs. In some examples, the rate amplification factor, that is, the amount of pseudo-random numbers generated from each random number seed by each CSPRNG, may be variable. In particular, in some examples, the rate amplification factor may be matched to the losses of photons in the quantum transmission channel, so that the rate amplification factor is no greater than the inverse of the proportion of the transmitted encoded photons or pulses which are successfully received. Since the loss or successful reception of specific photons or pulses may be considered to be random, this may be considered as resulting in output secure keys and key bits which are full quantum entropy encoded even with rate amplification and replay by the CSPRNGs being used. Such a variable rate amplification factor may be used or the value selected based on user requirements. Different users of the system and the generated encryption keys may have different requirements for the degree of quantum sourced entropy used to encode photons.

In another alternative example where rate amplification and replay by CSPRNGs is used for the encoding of photons or pulses over the quantum transmission channel, a QRNG may be provided at the receiver, and the random numbers output by the QRNG may be used to select received encoded photons or pulses to be discarded if the rate amplification factor is greater than the inverse of the proportion of the transmitted encoded photons or pulses which are successfully received, with the number of received encoded photons or pulses which are discarded being arranged such that the rate amplification factor is no greater than the inverse of the proportion of the transmitted encoded photons or pulses which are successfully received and are not discarded. This approach may enable a full quantum entropy mode to be maintained without increasing the complexity at the transmitter end to enable changes in the rate amplification factor. It will be understood that in satellite systems it may be advantageous to have reduced complexity at the satellite based transmitter end of the system even if this increases complexity at the ground based receiver end. The selecting received encoded photons or pulses to be discarded may be carried out by the random numbers output by the QRNG directly selecting received encoded photons to be discarded or directly selecting received encoded photons to be retained. It will be understood that directly selecting received encoded photons to be retained corresponds to indirectly selecting received encoded photons to be discarded by failing to select them to be retained.

The embodiments described above have a fixed predetermined delay between the pseudo random number string produced by the first CSPRNG, based on the seed queue, and the pseudo random number string produced by the second CSPRNG, based on the replay seed queue. In some examples this delay may be varied to correspond to the actual round trip time of the SQKD system, which may for example, vary depending on the distance between the satellite 2 and the OGR 3. It will be understood that this variation is predictable based on the known orbital path of the satellite 2 relative to the known position of the OGR 3.

The embodiments described above have a predetermined delay between the pseudo random number string produced by the first CSPRNG, based on the seed queue, and the pseudo random number string produced by the second CSPRNG, based on the replay seed queue. In some examples this delay may be varied to correspond to the delays from communications times including any re-transmissions and also from processing delays.

In a further embodiment, a QRNG 21 is used to generate a seed queue 22, which is provided to a CSPRNG 23a, and the first CSPRNG 23a uses each random number of the seed queue 22 as a seed to generate a series, or string, of pseudo-random numbers 25. The strings of pseudo-random numbers 25 generated by the first CSPRNG 23a are then used by a transmitter 26 to make the various random choices used to encode the photons or pulses forming a transmitted quantum laser beam 4. However, unlike the embodiments set out above, the seed queue 22 is not stored for further use.

In this embodiment, the rate amplification by the first CSPRNG 23a enables pseudo-random numbers derived from the random number output of a single QRNG 21 to be provided to the SQKD transmitter at any desired rate regardless of the actual random number output rate of the QRNG 21, while maintaining compliance with relevant security standards. This rate amplification approach according to the embodiment may allow random numbers to be provided at a rate required by a transmitter of an SQKD system in a cheaper and simpler manner with reduced size, weight, and power requirements, which may provide a solution to the problems identified above, even without the use of the further replay concept.

In a further embodiment, in an SQKD system employing an active receiver basis selection architecture, where random base choices are made at the receiver, a QRNG 21 is used to generate a seed queue 22, which is provided to a CSPRNG 23a, and the first CSPRNG 23a uses each random number of the seed queue 22 as a seed to generate a series, or string, of pseudo-random numbers 25. The strings of pseudo-random numbers 25 generated by the first CSPRNG 23a are then used by at the SQKD receiver to make various random choices used to carry out active receiver base selection from a received quantum laser beam at the SQKD receiver. Again, in this embodiment, the seed queue 22 is not stored for further use.

In this embodiment, the rate amplification by the first CSPRNG 23a enables pseudo-random numbers derived from the random number output of a single QRNG 21 to be provided to the SQKD receiver at any desired rate regardless of the actual random number output rate of the QRNG 21, while maintaining compliance with relevant security standards. This rate amplification approach according to the embodiment may allow random numbers to be provided at a rate required by a receiver of an SQKD system in a cheaper and simpler manner with reduced size, weight, and power requirements, which may provide a solution to the problems identified above, even without the use of the further replay concept, In a further embodiment, an SQKD system may employ the rate amplification by a QRNG and one or CSPRINGs arranged to use rate multiplication as described above to provide random numbers to the receiver of an SQKD system for use in active receiver basis selection, in combination with the use of the full rate amplification and replay at the transmitter according to the previous embodiments.

The embodiments described above use a single QRNG to generate a random number string, which is used to seed one or more CSPRNGs. In other examples multiple QRNGs may be used, each providing random numbers to seed one or more CSPRNGs. For example, multiple QRNGs may be used in parallel to generate random numbers/bits at a higher bit rate than can be provided by a single QRNG. The random numbers output by the multiple QRNGs may be combined into a single random number string and then fed into a single seed queue in a similar manner to the embodiments described above, or the random numbers output by the multiple QRNGs may be fed into multiple seed queues associated with multiple CSPRNGs.

The embodiments described above have a quantum down-link beam from a satellite to a ground station, with various components located on the satellite or at the ground station. In alternative examples, this arrangement may be reversed, and the SQKD system may comprise a quantum uplink beam from a ground station to satellite, with the locations of the various system components being reversed.

In the embodiments described above, a single quantum beam between a satellite and a ground station is shown. In some examples, such as systems performing simultaneous QKD between two different ground stations, both of the quantum beams may be independently provided by the methods described above.

In the embodiments described above the system comprises a single optical ground receiver (OGR). The system may comprise any number of OGRs.

In the embodiments described above the system comprises a single satellite. The system may comprise any number of satellites.

In the embodiments described above the system is a quantum key distribution system. In other examples other cryptographic items could be distributed/delivered in addition to, or as an alternative to, encryption keys. Examples of such other cryptographic items include cryptographic tokens, cryptographic coins, or value transfers.

In the described embodiments of the invention parts of the system may be implemented as a form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although illustrated as a single system, it is to be understood that a system may be a distributed system.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of preferred embodiments is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A method of operating a quantum key distribution (QKD) system, the method comprising:

using at least one quantum random number generator (QRNG) to generate a random number string, and storing the random number string;

providing the random number string to a first cryptographically secure pseudo-random number generator (CSPRNG) which uses random numbers of the random number string as seeds to generate respective first strings of pseudo-random numbers;

using the first strings of pseudo-random numbers to encode photons or pulses transmitted by a transmitter of the QKD system;

after a predetermined delay, providing the stored random number string to a second CSPRNG which uses random numbers of the random number string as seeds to generate respective second strings of pseudo-random numbers, the second CSPRNG being identically configured to the first CSPRNG; and using the second strings of pseudo-random numbers, together with information regarding encoded photons or pulses received by a receiver of the QKD system, to carry out raw key agreement and post processing to agree secure keys between the transmitter and the receiver.

2. The method of claim 1, in which each of the first and second CSPRNGs is an array comprising plural CSPRINGs.

3. The method of claim 1, in which each CSPRNG is a deterministic random bit generator (DRBG).

4. The method of claim 1, in which the at least one QRNG generates the random number string at a first bit rate, and a first CSPRING generates the first strings of pseudo-random numbers at a second bit rate higher than the second bit rate.

5. The method of claim 4, in which a ratio between the first bit rate and the second bit rate is fixed.

6. The method of claim 4, in which a ratio between the first bit rate and the second bit rate may be varied.

7. The method of claim 4, in which a ratio between the first bit rate and the second bit rate is arranged to be no greater than an inverse of a proportion of the encoded photons or pulses transmitted by the transmitter which are successfully received at the receiver.

8. The method of claim 4, in which, after the encoded photons or pulses transmitted by the transmitter are received at the receiver, if a ratio between the first bit rate and the second bit rate is greater than an inverse of a proportion of the encoded photons or pulses transmitted by the transmitter which are successfully received at the receiver, a further QRNG is used to select successfully received photons or pulses to be discarded, such that the ratio between the first bit rate and the second bit rate is no greater than an inverse of a proportion of the encoded photons or pulses transmitted by the transmitter which are successfully received at the receiver and not discarded.

9. The method of claim 1, in which, after the second strings of pseudo-random numbers and the information regarding encoded photons or pulses received by the receiver are used to carry out raw key agreement, any pseudo-random numbers of the second strings of pseudo-random numbers which are not associated with encoded photons or pulses received by the receiver are discarded.

10. The method according to claim 9, in which, only pseudo-random numbers of the second strings of pseudo-random numbers which are associated with encoded photons or pulses received by the receiver are retained for use in post processing.

11. The method of claim 1, in which the predetermined delay is fixed.

12. The method of claim 1, in which the predetermined delay is variable.

13. The method of claim 1, in which the predetermined delay is selected to substantially correspond to a time taken from the generation of a pseudo-random number in the first CSPRNG until information regarding an encoded photon or pulse received by the receiver, which encoded photon or pulse was encoded using that pseudo-random number, is available for raw key agreement.

14. The method of claim 1, further comprising:

using at least one further QRNG to generate a further random number string;

providing the further random number string to a further CSPRNG which uses random numbers of the further random number string as seeds to generate respective further strings of pseudo-random numbers; and using the further strings of pseudo-random numbers to carry out active base selection by a receiver of the QKD system.

15. The method of claim 1, in which the method is carried out at the transmitter of the QKD system.

16. The method of claim 1, in which the QKD system is an SQKD system.

17. The method of claim 16, in which the transmitter is at a ground station and the receiver is on a satellite.

18. The method of claim 16, in which the transmitter is on a satellite and the receiver is at a ground station.

19. A quantum key distribution (QKD) system comprising:

at least one quantum random number generator (QRNG) arranged to generate a random number string, and storing the random number string;

a first cryptographically secure pseudo-random number generator (CSPRNG) arranged to use random numbers of the random number string as seeds to generate respective first strings of pseudo-random numbers;

an encoder arranged to use the first strings of pseudo-random numbers to encode photons or pulses transmitted by a transmitter of the QKD system; and a second CSPRNG arranged to use random numbers of the random number string as seeds to generate respective second strings of pseudo-random numbers, the second CSPRNG being identically configured to the first CSPRNG;

wherein the system is arranged to provide the stored random number string to the second CSPRNG after a predetermined delay; and the system is arranged to use the second strings of pseudo-random numbers, together with information regarding encoded photons or pulses received from a receiver of the QKD system, to carry out raw key agreement and post processing to agree secure keys between the transmitter and the receiver.

20. A computer-readable medium comprising code or computer instructions stored thereon, which when executed by a processor, causes the processor to perform a method comprising:

using at least one quantum random number generator (QRNG) to generate a random number string, and storing the random number string;

providing the random number string to a first cryptographically secure pseudo-random number generator (CSPRNG) which uses random numbers of the random number string as seeds to generate respective first strings of pseudo-random numbers;

using the first strings of pseudo-random numbers to encode photons or pulses transmitted by a transmitter;

after a predetermined delay, providing the stored random number string to a second CSPRNG which uses random numbers of the random number string as seeds to generate respective second strings of pseudo-random numbers, the second CSPRNG being identically configured to the first CSPRNG; and using the second strings of pseudo-random numbers, together with information regarding encoded photons or pulses received by a receiver, to carry out raw key agreement and post processing to agree secure keys between the transmitter and the receiver.

\* \* \* \* \*